United States Patent Office 2,733,175

Patented Jan. 31, 1956

2,733,175

PROCESS FOR MAKING MAGNETIC RECORDING WIRE

Marvin Camras and Edson S. Bumps, Chicago, Ill., assignors to Armour Research Foundation of Illinois Institute of Technology, Chicago, Ill., a corporation of Illinois No Drawing. Application March 4, 1952, Serial No. 274,836

4 Claims. (Cl. 148—102)

The present invention is concerned with an improved alloy for magnetic recording purposes, and to a method of preparing the same.

More particularly, the present invention relates to a magnetic impulse record member in the form of a wire, tape, ribbon, or the like formed of a copper-nickel-iron alloy.

The two most important magnetic characteristics of a magnetic material which determines its applicability for magnetic recording purposes are the coercive force ($H_c$), and the residual induction ($B_r$). In general, the low frequency response of a magnetic record member is proportional to its residual induction, while its high frequency response is improved by a relatively high coercive force. A relatively high coercive force value is also desirable from the standpoint of the ability of the magnetic impulse record member to retain magnetically recorded impulses. At the same time, for ordinary magnetic recording purposes, the coercive force value of the material should not be high enough so that erasing of the recorded signal is rendered difficult. A similar balance must be achieved with respect to the residual induction, as an excessively high residual induction value generally means relatively poor high frequency response and bad transfer characteristics. Magnetic transfer occurs in some magnetic recording wires by means of a transfer of magnetic energy from a recorded portion of a wire to an unrecorded portion immediately adjacent the recorded portion. This effect is commonly observed when a magnetic recording wire is tightly wound about a reel with recorded portions of the wire in intimate contact with adjacent strands or underlying layers of unrecorded wire. In playing back the wire, some of the recorded intelligence appears on the previously unrecorded portion of the wire and if this transfer is of a sufficiently high value, the transferred signal will be audible, giving rise to an objectionable "ghost" record. For low transfer characteristics, the residual induction characteristic of the material should be negligible for applied fields up to a critical value, after which it should rise rapidly to saturation.

It has previously been suggested that certain copper-nickel-iron alloys are suitable for use in magnetic impulse members. The most common of these alloys is one containing 60% copper, 20% nickel, and 20% iron. However, wires from the types of alloys previously used when cold worked and drawn to a diameter on the order of 0.004 inch do not have coercive force values and residual induction values suitable for magnetic recording purposes in the as drawn condition. Such wires require further extensive heat treatment after drawing to achieve increased magnetic properties. However, the additional heat treatment carries the magnetic properties of the alloys well beyond the optimum limits for magnetic recording purposes. For example, alloys having 60% copper, 20% nickel and 20% iron can be aged to achieve coercive force values of 800 or higher, but values of coercive force in the range from 200 to 300 oersteds are extremely difficult if not impossible to achieve because the rate of change of coercive force with respect to time and temperature is quite rapid. At the same time, the $B_r$ of these alloys is far above the range considered useful in modern magnetic recorders. While alloys of this type have some usefulness, they are not well adapted for magnetic recording purposes because of the difficulty in erasing and the bad transfer characteristics. The high iron content of the wires also makes drawing difficult.

On the other hand, many of the alloys of the present invention have very desirable magnetic properties in the as drawn condition and need not be further subjected to heat treatment in order to produce an acceptable magnetic recording medium. Those alloys which do not have sufficiently high magnetic properties may be heat treated by means of a relatively simple aging treatment to achieve the required values. For ordinary magnetic recording purposes, the magnetic values strived for include a coercive force of between 200 and 350 oersteds and a residual induction between 1000 and 3500 gausses. Many of the alloys of the present invention have coercive force values and residual induction values within these preferred ranges in the as drawn condition whereas, to our knowledge, none of the previously used copper-nickel-iron alloys is capable of achieving these values in the as drawn condition, nor do these previously used alloys have the low transfer properties of the alloys of this invention.

An object of the present invention is to provide an improved copper-nickel-iron alloy for magnetic recording purposes.

Still another object of the present invention is to provide an improved magnetic recording wire having good magnetic recording properties in the as drawn condition.

A further object of the present invention is to provide a corrosion resistant, high coercive force magnetic recording wire from a copper-nickel-iron alloy.

A further object of the present invention is to provide a method for the manufacture of an improved copper-nickel-iron magnetic recording record medium.

The copper base alloys of the present invention contain, as their essential ingredients 70 to 85 percent by weight copper, 10 to 20 percent by weight nickel and 5 to 15 percent by weight of iron. A preferred range within the broader range given in which the alloys have improved magnetic recording properties in the as drawn condition is the range in which the copper content is 70 to 80 percent, the nickel content is from 12.5 to 17.5 percent, and the iron content is from 7.5 to 12.5 percent.

For best results, the nickel content of the composition should be at least as high as the iron content, but preferably not in excess of three times the iron content. The best alloys appear to be those in which the nickel content is approximately 1.5 times the iron content.

The following table illustrates the magnetic properties of some of the alloys of the present invention in their as drawn condition, the alloys being cold worked from a 1/16 inch stock to a wire of .004 inch in diameter by means of swaging and then drawing through suitable dies.

*Table I*

| Sample | Composition | | | $H_m$ | $H_c$ | $B_r$ | $B_m$ |
|---|---|---|---|---|---|---|---|
| | Percent Cu | Percent Ni | Percent Fe | | | | |
| A | 77.5 | 15 | 7.5 | 2,000 | 200 | 937 | 1,874 |
| B | 75 | 15 | 10 | 2,000 | 250 | 1,562 | 2,030 |
| C | 75 | 15 | 10 | 2,000 | 275 | 1,375 | 2,062 |
| D | 85 | 10 | 5 | 2,000 | 140 | 700 | 495 |
| E | 70 | 15 | 15 | 2,000 | 70 | 3,600 | ------- |

In the foregoing table, $H_m$ represents the value of the applied field in oersteds, $H_c$ is the coercive force value in oersteds, $B_r$ is the residual induction in gauss, and $B_m$ is the maximum value of B obtained when the applied field is at a value of $H_m$.

The following table illustrates the magnetic properties of a copper-nickel-iron alloy of .004 inch in diameter in the as drawn condition after cold working from materials of various dimensions.

*Table II*

| Sample | Composition | | | Original diameter in inches | $H_c$ | $B_r$ | Transfer (5 Db below sat.), Db | Tensile strength, lbs. |
|---|---|---|---|---|---|---|---|---|
| | Percent Cu | Percent Ni | Percent Fe | | | | | |
| F | 80 | 12.5 | 7.5 | 0.064 | 355 | 1,750 | 33 | 1.25 |
| G | 80 | 12.5 | 7.5 | 0.350 | 385 | 1,600 | 32 | 1.3 |
| H | 77.5 | 15 | 7.5 | 0.075 | 245 | 1,500 | 27.5 | 1.65 |
| I | 75 | 15 | 10 | 0.250 | 275 | 2,000 | 29 | 1.55 |
| J | 72.5 | 17.5 | 10 | 0.250 | 295 | 2,300 | 31.5 | 1.65 |

The measure of transfer in the above table was determined at a level of 5 decibels below saturation. Transfer can be conveniently measured by recording a signal on a relatively short length of wire at a predetermined level. The recorded wire is then tightly wound upon a reel over and adjacent to layers of wire which have been unrecorded. The wire is then passed through a reproducing device and the signal level of the reproduced signal on the recorded portion of the wire is compared with the signal level of the previously unrecorded portion of the wire immediately adjacent to the recorded portion of the wire. The ratio of the two signal levels, expressed in decibels, provides a convenient measure of the amount of transfer between the recorded and unrecorded portions of the wire.

While the amounts of transfer indicated in the above table are not particularly objectionable, the transfer characteristics of the wires of the present invention can be further improved by a simple heat treatment before drawing down the wire to its final dimensions, or after the drawing. The wires of the present invention are preferably drawn to a diameter not in excess of 0.005 inch, and preferably are on the order of 0.003 to 0.004 inch in diameter.

Apparently, wires in the as drawn condition exhibit transfer properties due to imperfect homogeneity of iron-rich particles within the copper-nickel matrix. The imperfect homogeneity of the iron-rich particles creates areas of differing magnetic properties which apparently contribute to increased transfer of recorded magnetic energy to adjoining strands of the wire. In order to overcome this transfer effect, the composition of the wire can be made more homogeneous, i. e., the distribution of the iron-rich particles can be rendered more uniform, by an aging treatment at elevated temperatures. The temperature employed in aging can vary within the range from about 450° to 800° C. A time from a few minutes to one hour is satisfactory. Treatment of the wire at these temperatures results in more homogeneous magnetic properties of the iron-rich particles within the alloy composition and significantly decreases the amount of transfer. Temperatures in excess of 800° C. should be avoided during aging because of excessive solubility of the iron-rich particles in the copper-nickel matrix at the higher temperatures.

The aging treatment not only suffices to reduce the amount of transfer but usually increases the desired magnetic properties. For example, an alloy having a composition of 80% copper, 15% nickel, and 5% iron had had a coercive force value of 50 and a residual induction of 200 in the as drawn condition. A specimen of this wire of a diameter of 0.004 inch was subjected to an aging treatment for one hour in a reducing atmosphere and air cooled. When the temperature in the furnace was maintained at a value of about 500° C., the coercive force value increased to about 210 and the residual induction was increased to about 900 gauss. When the temperature was increased to 550° C., the coercive force value was raised to about 250 oersteds and the residual induction increased to about 1050 gauss.

The aging treatment is carried out under non-oxidizing conditions, and preferably in the presence of a reducing gas such as hydrogen, carbon monoxide and the like. The time for aging will vary depending upon the size of the sample being treated, the required aging time decreasing as the diameter of the wire decreases. For wire diameters as large as 1/16 inch, aging times of about one hour are appropriate, where with very fine wires aging times as little as two to three minutes are appropriate. Apparently, the aging treatment is complete within a period of one hour or less, and further treatment for periods of time in excess of one hour does not contribute to increased magnetic properties or transfer reduction and in some cases may actually decrease the desired magnetic properties or transfer reduction. For that reason, we prefer to limit the aging treatment to times not in excess of one hour.

In cold working alloys of the present invention which have substantial amounts of iron present, it is often desirable to soften the wire during the cold working. This softening is most conveniently accomplished by passing the wire through an annealing furnace maintained at temperatures within the range from about 800 to 1000° C. for a few minutes while the wire still has a diameter substantially in excess of the final diameter. While the annealing treatment may cause some dissolution of iron-rich particles in the matrix, the subsequent cold working of the alloy effects reprecipitation of the iron-rich particles. Where the wire is both annealed and aged prior to the reduction to the final diameter, the annealing step should precede the aging step. For example, in drawing a wire down to a diameter of about 0.004 inch the wire can be annealed when the diameter is on the order of 0.02 inch and aged after the wire had been drawn down to a diameter of 0.01 inch or less.

The alloys of the present invention are quite corrosion resistant and readily workable. The magnetic properties are generally equal to magnetic properties in the best stainless steel magnetic recording wires, and are interchangeable with stainless steel wires for magnetic recording wires. The alloys of the present invention have the distinct advantage, as compared with stainless steel wires or copper-nickel-iron alloys of different compositions, that simple cold working and drawing of the wire is sufficient to achieve good properties for magnetic recording, without the necessity of extensive and repeated heat treatments before and after the drawing of the wire. The alloys of the present invention are considerably more ductile than stainless steel wire, making possible higher drawing speeds and increasing the life of the drawing dies. The copper base alloys are also less expensive than stainless steel wires used for recording purposes. Where heat treatment is indicated for some of the alloys, the temperatures and times involved are not particularly critical to achieve the desired magnetic properties.

As mentioned previously, the magnetic properties of the wires of the invention are at least equal to the best stainless steel recording wires now available. For a more comprehensive appreciation of the improved magnetic properties, the following data is submitted. A wire of a diameter of 0.004 inch and containing 10% iron, 17.5% nickel, and the balance copper had a coercive force value of 315 oersteds and a residual induction of 2550 gauss. The corrected A. C. noise level was minus 1 db (this and succeeding db readings being based on a zero level of 10 microvolts). The D. C. noise level was 6 db. At signal values at saturation, the signal to noise ratio for A. C. noise (corrected) was 56.5 db, and for D. C. noise was 49.5 db. The response curve at 100 cycles was down 15 db, and at 5000 cycles was down 3.5 db. The transfer ratio found when the wire was magnetized with a saturated signal was 36 db, while at a signal level of 5 db below saturation, the transfer ratio was 44.5 db.

It will be understood that modications and variations may be effected without departing from the scope of the novel concepts of the present invention.

We claim as our invention:

1. The method of making wire for magnetic recording purposes which comprises cold working a copper base alloy consisting essentially of 70 to 85 percent copper, 10 to 20 percent nickel, and 5 to 15 percent iron, the nickel to iron ratio being within the range of 1 to 1 to 3 to 1, down to a diameter on the order of 0.004 inch and aging said wire at a temperature in the range from 450 to 800° C. until the wire has a coercive force value in the range from 200 to 350 oersteds and a residual induction in the range from 1,000 to 3500 gauss.

2. A magnetic recording wire having the following composition: 70 to 85 percent copper, 10 to 20 percent nickel, and 5 to 15 percent iron, made in accordance with the method of claim 1.

3. The method of making wire for magnetic recording purposes which comprises cold working a copper base alloy consisting essentially of 70 to 85 percent copper, 10 to 20 percent nickel, and 5 to 15 percent iron, the nickel to iron ratio being within the range of 1 to 1 to 3 to 1 down to a diameter of about 0.01 inch, aging said wire of said diameter at a temperature in the range from 450° to 800° C., and thereafter further cold working the aged wire down to a diameter of about 0.004 inch to thereby produce a recording wire having a coercive force value in the range from 200 to 350 oersteds and a residual induction in the range from 1000 to 3500 gauss.

4. A magnetic recording wire produced according to the method of claim 3.

References Cited in the file of this patent

UNITED STATES PATENTS

| | | |
|---|---|---|
| 1,491,913 | Kirk et al. | Apr. 29, 1924 |
| 1,992,325 | Schaarwachter | Feb. 26, 1935 |
| 2,196,824 | Dahl et al. | Apr. 9, 1940 |
| 2,334,753 | Crampton et al. | Nov. 23, 1943 |
| 2,437,563 | Seavor | Mar. 9, 1948 |
| 2,522,665 | Cooper et al. | Sept. 19, 1950 |
| 2,549,469 | Howe | Apr. 17, 1951 |